May 24, 1932.   J. E. MARSHALL   1,860,259
COMBINED INCLINOMETER AND COMPASS
Filed Sept. 30, 1929
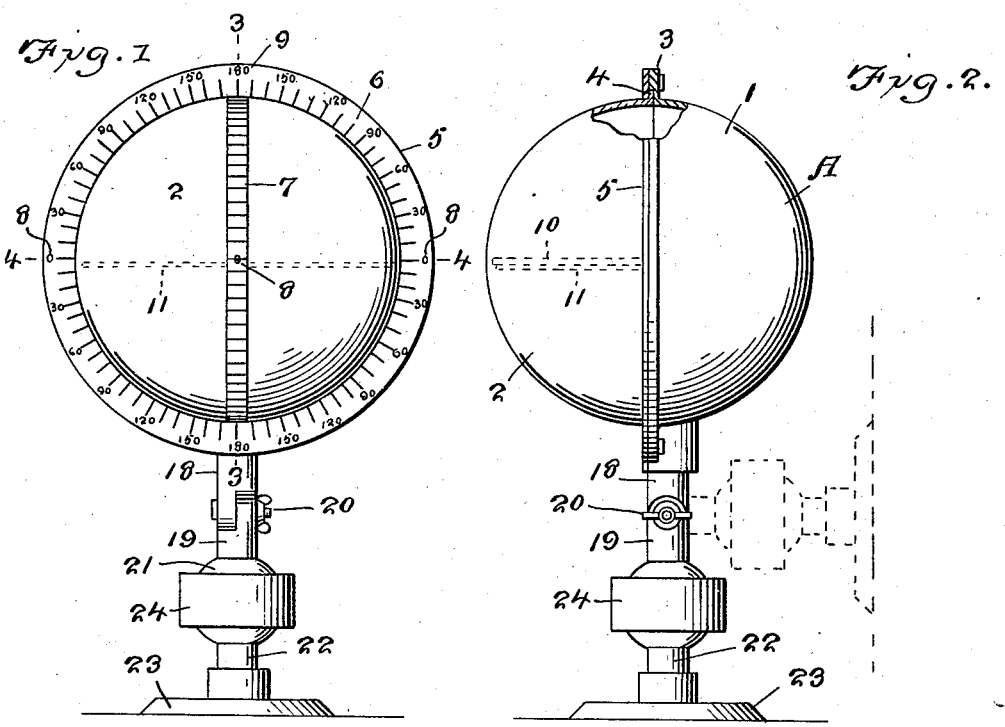
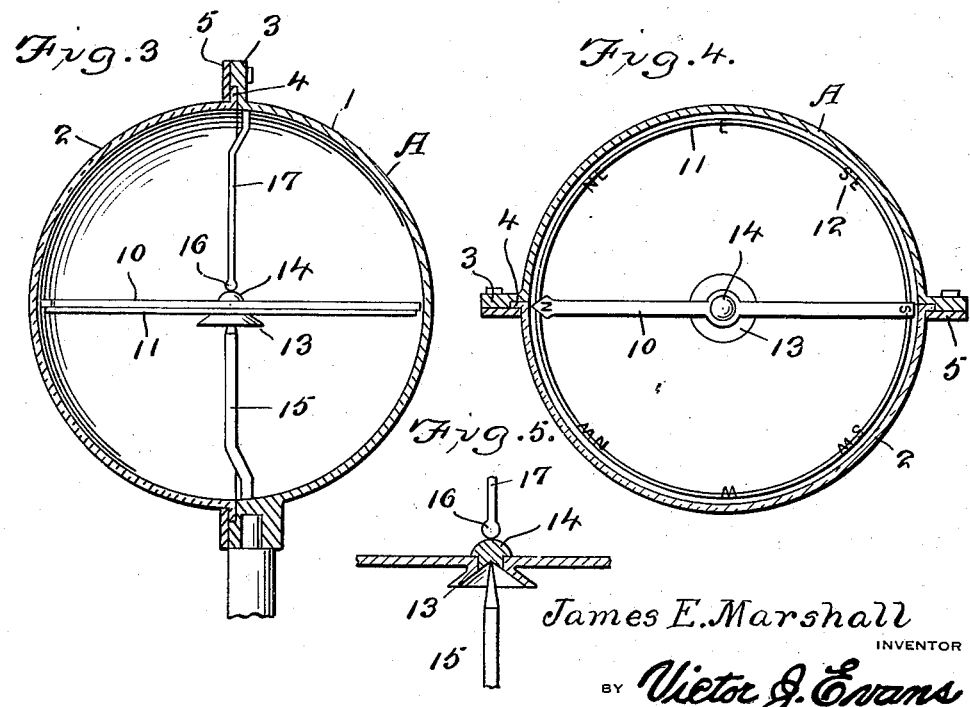
James E. Marshall
INVENTOR
BY Victor J. Evans
ATTORNEY Patented May 24, 1932

1,860,259

UNITED STATES PATENT OFFICE

JAMES E. MARSHALL, OF AMARILLO, TEXAS

COMBINED INCLINOMETER AND COMPASS

Application filed September 30, 1929. Serial No. 396,285.

This invention relates to a combined inclinometer and compass for enabling an aviator or other person to ascertain the direction in which he is traveling and also to ascertain the degree of inclination of his ship in any direction relative to the normal level of the ground, the general object of the invention being to provide a hollow sphere formed with a transparent part and a compass arranged in the sphere, said compass being movably supported in the sphere so that it can always point to the north and so that it can act as a marker on the graduations associated with the sphere for indicating the longitudinal and transverse tilts of the craft. Thus with this device, an aviator, for instance, can ascertain the angle of descent and ascent and of the banks and turns as well as the direction he is traveling.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a front view of the device.

Figure 2 is a side view thereof with parts broken away.

Figure 3 is a section on line 3—3 of Figure 1.

Figure 4 is a section on line 4—4 of Figure 1.

Figure 5 is a detail view showing the supporting means for the compass.

In these views, the letter A indicates a spherical member which is preferably formed of a rear metal half 1 and a transparent front half 2, the metal part having a flange 3 thereon formed with a groove in its front face to receive a flange 4 on the transparent part. The flange 4 is held in the groove by an annular strip 5 suitably fastened to the flange 3 and having the graduations 6 on its front face. Graduations 7 are also etched or otherwise placed on the vertical center of the transparent member, and I prefer to so arrange the graduations that the three zero marks 8 are arranged in a horizontal plane when the device is in an upright position, as shown in Figure 1, and with the 180° marks on the scale 6 at the top and bottom of the device, as shown at 9.

A compass is movably arranged within the spherical member and consists of the usual needle 10 and a ring 11 which are connected with the ends of the needle, as shown in Figure 4, the ring carrying the usual indications 12 for giving the points of the compass. The center of the needle is provided with a substantially conical depending part 13 and a jewel 14 is placed in an opening at the upper end of the conical part to form a bearing for the needle-like supporting member 15 which has its lower end connected with the lower part of the member 1. The upper end of the jewel is rounded as shown, and the enlarged rounded end 16 of a depending rod 17 engages this rounded part of the jewel, the upper end of the rod being connected with the upper part of the member 1.

Thus it will be seen that the compass is supported for free rotary movement within the sphere and also for tilting movement in any direction so that the compass will always point north and as the ship tilts in any direction, the compass remains in a horizontal position and will thus indicate on the graduations 6 and 7 the amount of tilt of the ship. For instance, if the aviator is ascending, the spherical member will be tilted and as the compass remains in a horizontal position, a part of the compass will indicate on the scale 6 the angle of tilt so that the aviator will know the angle of his ascent. The same is true when the aviator is descending and when the craft is tilted sidewise, such as in making turns, banks or for any other reason, the compass will indicate the angle of tilt on the scale 7. Thus this device will indicate the direction of travel and the angles of climb, turns and banks so that the aviator can readily tell in what direction he is traveling and whether or not he is traveling on an even keel and the angle of longitudinal and transverse tilt if he is not traveling on an even keel.

A stem 18 is fastened to the bottom of the spherical member and is pivoted to a stem 19 by a bolt and wing nut shown generally at 20. A ball and socket connection 21 connects the stem 19 to a stem 22 which is formed with a base 23 fastened to an instrument board or other part of the craft. A knurled nut 24 is provided for tightening the ball and socket joint after the parts are adjusted. This arrangement permits the device to be attached to a horizontal part of the craft, as shown in Figures 1 and 2, or to a vertical part, as shown in dotted lines in Figure 2. The arrangement also permits the device to be fastened to any part of the craft, with the sphere in upright or vertical position when the craft is on a horizontal keel.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a spherical member having its rear half formed of metal and its front half of transparent material, an annular scale surrounding the inner part of the transparent portion, there being a second scale formed on the vertical central portion of the transparent part, a compass including a needle and a ring pivotally supported in the spherical member, whereby the compass will indicate the direction of travel and the inclination of a craft both longitudinally and transversely, the supporting means for the compass including upwardly and downwardly extending rods terminating adjacent the center of the spherical member, a bearing member at the center of the needle resting on the pointed end of the upwardly extending rod, said bearing member having a rounded upper end which is slidingly engaged by the lower end of the downwardly extending rod.

In testimony whereof I affix my signature.

JAMES E. MARSHALL.